C. K. FULLER.
PICTURE HANGER.
APPLICATION FILED JULY 17, 1911.

1,065,350.

Patented June 24, 1913.

WITNESSES
Fenton S Belt
Chr. R. Nielsen

INVENTOR
Charles K. Fuller,
By H S Woodward
Attorney

UNITED STATES PATENT OFFICE.

CHARLES KENNETH FULLER, OF LYNN, MASSACHUSETTS.

PICTURE-HANGER.

1,065,350.

Specification of Letters Patent. Patented June 24, 1913.

Application filed July 17, 1911. Serial No. 638,900.

*To all whom it may concern:*

Be it known that I, CHARLES KENNETH FULLER, a citizen of the United States, residing at Lynn, in the county of Essex and State of Massachusetts, have invented new and useful Improvements in Picture-Hangers, of which the following is a specification.

This invention relates to headed fastenings and more particularly to an improvement in push pins, thumb tacks and picture hangers.

It has for an object to provide a fastener adapted to be used as a push pin for securing prints upon a flat surface, and the head of which while being broad rounded and flat for comfortable engagement of a thumb thereagainst is adapted to serve as a hook and is also shaped for embracement of a nail stem while the head is held thereunder to prevent its casual disengagement.

In connection with this construction it is an important object to obviate difficulty in engaging the stem and head of a nail or the like in my device. An object attained in the success of the last named endeavors is the adaptation of the device to serve as a picture hanger.

In fitting the fastener for picture hanging it is necessary to provide a stop means to prevent its being driven too deeply into a frame, and it is an object to so form a stop element that it will buttress the projecting portion of the pin and prevent its bending at the point of entrance into the frame, and also add longitudinal rigidity to the projecting portion of the stem, and also to give rigidity to the projecting point portion outwardly of the stop. A desirable end accomplished in this way is the utilization of extremely light material, in the manufacture of the fastener.

Figure 1:
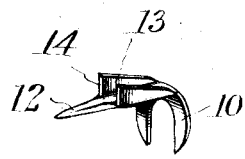
Figure 2:
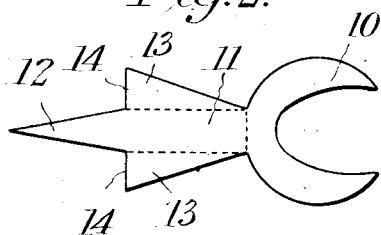
Figure 3:
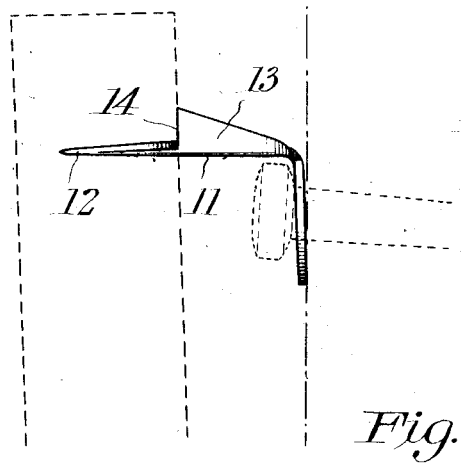
Figure 4:
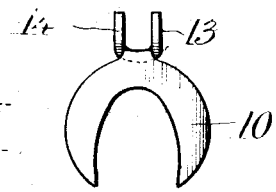
Figure 5:
Figure 6:

Other objects and advantages will be apparent from the following description and from the drawings, in which, Figure 1 is a perspective view of the device. Fig. 2 is a plan of the blank. Fig. 3 is a side view of the device in use, Fig. 4 is a top view of the head, Fig. 5 is a perspective view of a modification provided with a screw point. Fig. 6 illustrates a method of using the device.

There is illustrated a fastener comprising a head 10, a shank 11, and a point 12, all formed integrally from one blank of sheet metal as shown in Fig. 2. The head is U-shaped in plan being so formed in the stamping, and from the outer edge of its bight portion there springs the shank 11 which is trapezoidal in shape, its reduced portion joined to the head. From its base or outer edge springs the point 12, which, at its junction with the shank is approximately the same width as the shank at its connection with the head. From its base the point portion tapers suitably to a sharp point, as shown.

Parallel lines drawn longitudinally from each side of the junction of the shank with the head toward the point portion as in Fig. 2, leave portions of the shank projecting outwardly thereof on each side in the form of right angle triangles, which may be termed buttress ribs 13 because of their subsequent function in the use of the fastener. These are bent on the dotted lines toward one side of the blank in parallel relation, and in the bending a part of the intervening portion of the blank is also bent, including the point portion, as seen in Figs. 1 and 3. Thus the outer edges 14 of the ribs lie in a plane, whereby they serve as a foot portion for engaging the surface of a frame to prevent bending of the point or shank, as will be described. The head 10 is bent in a direction opposite that of the ribs 13 into a plane at right angles to the direction of the point, although this angle is not arbitrary and may be varied as desirable.

For use as a push pin its manipulation will be readily understood, and it will be apparent that by the transverse curvature extending throughout the length of the point and shank, and with the ribs 13 in addition, a very rigid pin is provided.

For use to hang a picture frame, the point is driven into the rear face of the frame centrally of its upper part, with the furcations of the head 10 extended downwardly. A headed fastening such as a nail, tack, or screw, or even a pin, is then driven into the surface upon which the picture is to be hung, and by presenting the back of the picture against the surface with the head over the driven fastening on the wall, and drawing the picture downwardly the projecting part of the nail or the like may readily be engaged within the head 10. It is not essential to use a headed nail or the like, as a plain peg or pin would serve, but by the engagement of the furcations of the head 10 around the shank of a nail or tack, liability of the picture's slipping outwardly from its support is reduced to a minimum. If the picture is to be hung on a molding or line, the downwardly projecting portion of the head will readily serve to engage either.

In the use of a plain flat shank on the device, or even one transversely curved or longitudinally ribbed by indentation, if my device were so constructed, when it is driven into a frame or other material, with the head spaced from the material, when supporting a considerable weight it will be appreciated that the liability of breakage is greatest at the surface of the frame, where the device would tend to break off short. The desirability of the particular form of buttressing ribs which I employ will consequently be apparent, as they are disposed above the shank, with the foot edges 14 arranged to bear inwardly against the frame surface and prevent bending of the shank at the point of its entrance. An important advantage also lies in having the point transversely curved at its junction with the shank, for the reason that if it were simply flat, under the tendency of the shank to bend upwardly, a certain amount of leverage would be exerted by the foot portions of the ribs, which might draw the point from the material engaged, such action being made possible by the ease of bending the flat point. By the rigidity of the connection between the point and shank the leverage action is prevented.

An important use to which the invention is adapted is that of a wall support and bracket. By driving the device into a wall with the furcations of the head projected upwardly, it is able to support a considerable weight, and may be used as a hook support for various purposes. Wires may be strung on the device by laying them over the stem when driven into a wall as mentioned and bending the head portion inward over and against the wire, and in this way it may be found to serve better than the customary staples, which it is often difficult to engage over a wire properly, and also are difficult to drive in straight.

The heads are adapted to interlock, as shown in Fig. 6, whereby one of my fasteners may be driven into a wall and another into a frame and the two coengaged as shown to support the frame. In this way it is important to note that swaying of a frame thus suspended is prevented. The shanks are adapted to be received within the heads, in this use, and the engagement of the furcations of the two heads against the shanks prevents the swaying of an object suspended as just described.

In Fig. 5 there is illustrated a modification of the device in which the point portion 12' is in the form of a screw, the method of forming which will be understood by those versed in the art. By the latter construction the invention is adapted to support small curtain rods, and is useful for other purposes where screw hooks are ordinarily employed.

What is claimed is:

1. A device of the class described comprising a bifurcated head, a shank portion having a strengthening and buttress rib formed longitudinally thereof and terminating in a lateral foot, and a point portion extended outwardly of the rib, the foot being adapted to abut a surface into which the point portion is driven.

2. As an improved article of manufacture, a headed support of the class described formed integrally from sheet metal and comprising a head, a shank having integral lateral extensions, increasing in width rearwardly from the head and having rear edges at right angles to the shank, and a point portion projecting rearwardly from the shank adjacent the said rear edges of the extensions, said extensions being bent laterally from the plane of the shank to form strengthening and buttressing ribs, their rear edges forming foot portions adapted to abut against a surface into which the point portion is driven.

3. As an improved article of manufacture, a headed support of the class described formed integrally from sheet metal and comprising a head, a shank extended therefrom having integral rear lateral extensions, their major portions disposed outwardly of the head and having rear edges at right angles to the shank, and a point portion extending rearwardly from adjacent the bases of the extensions, said extensions being bent laterally from the plane of the shank, the immediately adjacent portions of the shank and point portion being partly bent therewith, the said rear edges of the extensions being adapted to abut a surface into which the point portion is driven.

4. As an improved article of manufacture from sheet metal, adapted for use as a push pin, picture hanging nail, and the like—a broad head adapted for engagement by the thumb for emplacement of the device, a shank stamped integrally with, extending from the perimeter of, and at right angles to the plane of, the head; said shank having edge extensions bent toward the side of the shank opposite the head to form strengthening and buttressing elements adapted to engage a surface into which the device is driven, and a point portion on the shank outwardly of said extensions.

In testimony whereof I have hereunto set my hand in presence of two subscribing witnesses.

CHARLES KENNETH FULLER.

Witnesses:
 Roy F. Bergengren,
 Lynn M. Ranger.